Figure 1:
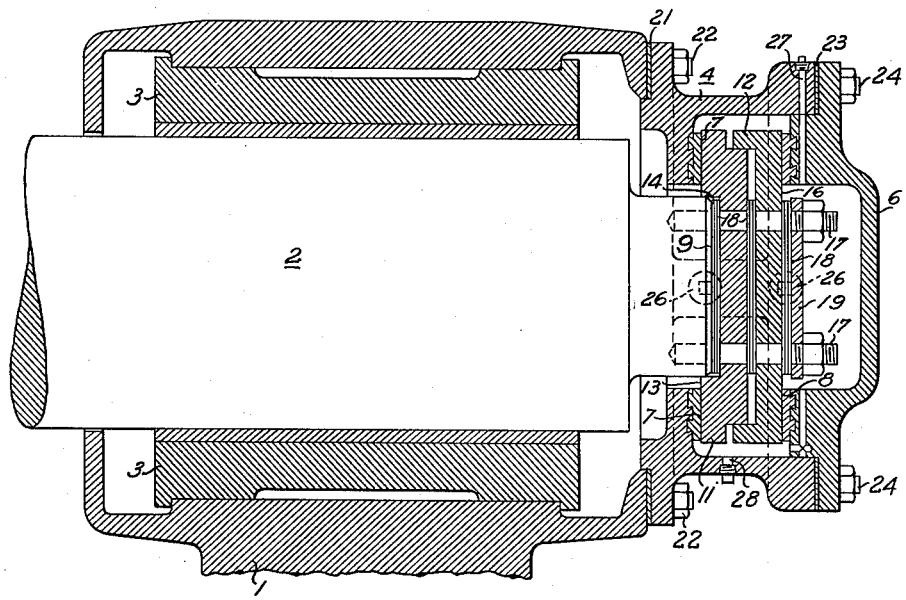

Oct. 24, 1950     A. J. ROUBAL     2,527,229
END THRUST BEARING
Filed Nov. 19, 1945

Inventor
Alexander J. Roubal
by William L. Gates
Attorney

Patented Oct. 24, 1950

2,527,229

UNITED STATES PATENT OFFICE 2,527,229

END THRUST BEARING

Alexander J. Roubal, Milwaukee, Wis., assignor to Allis-Chalmers Manufacturing Company, Milwaukee, Wis., a corporation of Delaware Application November 19, 1945, Serial No. 629,599

5 Claims. (Cl. 308—164)

This invention relates to improvements in end thrust bearings for rotating shafts.

An object of the invention is to provide a compact double end thrust bearing in a readily sealed housing, rigidly secured to a machine frame, with provision for adjustment of the shaft axially relative to the thrust bearing housing and adjustment of clearance in both directions between the opposed thrust bearing surfaces.

Another object of the invention is to provide a self contained thrust bearing unit in which all adjustments are made by changing relative axial positions of parts of the rotating assembly.

More particularly the invention relates to an improved thrust bearing in which a thrust flange on the rotating assembly and having thrust bearing surfaces on opposite faces is so constructed and arranged as to provide for adjustment of each thrust bearing surface axially relative to both the shaft and the other said thrust bearing surface.

Figure 2:
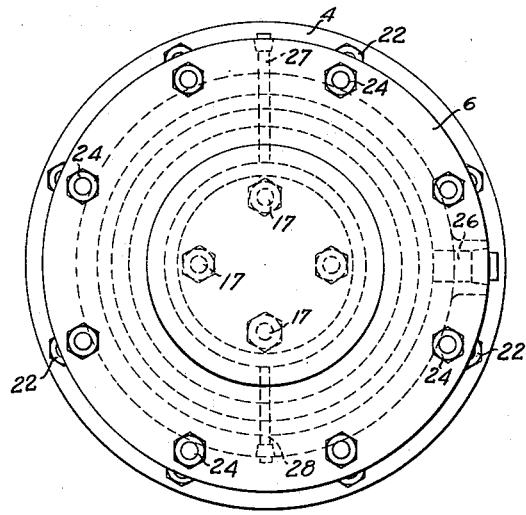

The above and still further objects and advantages may be carried into practical effect as hereinbelow described with reference to the drawing in which:

Fig. 1 is a longitudinal section through an end thrust bearing according to the invention shown attached to a fragment of the frame of a machine (not shown); and Fig. 2 is an end elevation of the thrust bearing housing of Fig. 1 taken from the right.

In the particular embodiment of the invention illustrated in the drawing, 1 is a frame or housing of a machine which may for example be a mine hoist, or other machine, having a rotatable shaft 2 journalled in a bearing 3.

In order to maintain the shaft 2 in a desired position axially it is necessary to provide for axial thrust in both directions.

According to the present invention a thrust bearing housing 4, having an end cap 6, is secured in axially fixed relation to the frame or housing 1 of the machine. Housing 4 and its cap 6 are so designed and assembled as to present a pair of fixed axially spaced opposed thrust bearing surfaces 7 and 8 coaxial with shaft 2 and surrounding a transverse surface of the shaft, such as the shaft end face 9.

The rotatable member of the thrust bearing of this invention may comprise, as shown in the drawing, a thrust bearing flange or plate 11 and an adjacent thrust bearing flange or plate 12. Plate 11 has a bearing surface portion 13 on one face, and may be recessed as at 14 to fit shaft 2 in coaxial relatively axially adjustable relation.

Plate 12 has a bearing surface portion 16 on one face and may have its back formed complementary to the back of plate 11 in such a manner that plates 11 and 12 may interengage or telescope in coaxial relatively axially adjustable relation with their bearing surfaces (13 and 16) facing in opposite directions, forming a variable thickness thrust bearing flange unit.

The telescoping interengagement of plates 11 and 12 and the recessing of plate 11 to fit shaft 2 are conducive to rigidity of the thrust bearing assembly, preventing misalinement, or lateral displacement, of the plates.

The plates 11 and 12 are arranged to be secured to shaft 2 as by bolts 17 fixed in the end of shaft 2. The axial position of shaft 2 with relation to machine frame 1 is established selectively as by placing a selected spacer or thickness of shims 18 between the shaft end face 9 and plate 11.

Adjustment of proper operative thrust bearing clearance as between fixed surfaces 7 and 8 and movable surfaces 13 and 16 is accomplished by placing a selected spacer or thickness of shims 18 between disks 11 and 12.

Additional spacers or shims 18 in any desired number may be placed to the right of plate 12 and held in position by bolts 17. A washer 19 is employed, if desired, to distribute the clamping force of bolts 17.

All shims 18 should be interchangeable so that all adjustments within practical limits may be accomplished by merely changing the order of the shims, the total number remaining constant.

The stack of shims and plates in selected order is firmly bolted into position against surface 9 of shaft 2 to form a rotating assembly.

A gasket 21 may be employed between housing 4 and frame 1 to provide a lubricant-proof seal. A similar gasket 23 may be employed between housing 4 and its end cap 6. Bolts 22 serve to secure housing 4 in fixed position relative to frame 1 and bolts 24 may be employed to secure end cap 6 in place on housing 4.

Housing 4 may be provided with gauging holes 26, normally plugged as shown when not in use, through which feelers may be inserted to determine the thrust bearing clearance. Lubricating oil may be supplied to the interior of housing 4 through an opening 27. A lubricating oil outlet 28 may also be provided.

It will be apparent that the above described thrust bearing unit has a housing with opposed spaced thrust bearing surfaces in axially fixed relation to the frame of the machine on which employed. Necessary adjustments may all be accomplished without changing the relationship of the housing 4 to frame 1 or cap 6 to housing 4. Accordingly, the entire bearing housing may be readily and effectively sealed against oil leakage.

It will also be apparent that all adjustments may be readily made by merely changing the order of shims 18 and plates 11 and 12. All necessary spare shims are carried on the rotating shaft inside the housing, so that it is not necessary to carry shims in stock outside the housing where they may be lost or damaged.

While a particular embodiment of the invention has been specifically described and illustrated, it will be understood that the invention is not limited to the precise structure illustrated, but includes such modifications and equivalents as may readily occur to persons skilled in the art to which it appertains, and is limited only by the scope of the appended claims.

It is claimed and desired to secure by Letters Patent:

1. A thrust bearing device for a rotatable shaft end comprising first and second thrust bearing disks having thrust bearing surfaces on opposite faces thereof, a plurality of interchangeable shims in selected number and thickness between said shaft end and said first disk and between said first and second disks for relative adjustment of each said thrust bearing surface relative to said shaft end and the other said thrust bearing surface, and means clamping said thrust disks and shims in selected angularly fixed relation against the end of said shaft.

2. In a thrust bearing for a rotatable shaft end, a fixed housing enclosing said shaft end and having a pair of fixed axially spaced opposed thrust bearing surfaces, a pair of disk elements adapted to be secured in angularly fixed axially adjustable relation to said shaft end, a plurality of shims interchangeably placed in selected numbers between said shaft end and said disks, between said disks, and on the outer side of the outermost disk relative to said shaft end, and means for clamping said disks and shims in selected order against said shaft end, said disks being provided on opposite faces with thrust bearing surfaces in thrust bearing relation to said fixed thrust bearing surfaces of said housing.

3. In an end thrust bearing assemblage, a housing having a pair of opposed fixed axially spaced thrust bearing surfaces, a rotatable assembly mounted for rotation on a fixed axis in said housing, a pair of thrust flanges adjacently mounted on said rotatable assembly in individually axially adjustable relation to a transverse surface on said assembly, interchangeable shims between said transverse surface and a first said flange and between said flanges, means for clamping said flanges and shims in selected order axially against said transverse surface of said rotatable assembly with said flanges presenting oppositely facing thrust bearing surfaces respectively in thrust bearing relation to said bearing surfaces of said housing, said clamping means providing for safe storage of a number of spare interchangeable shims on the far side of the outermost of said flanges from said transverse surface, adjustment of the axial relationship of said bearing surfaces to said rotatable assembly and to each other being accomplished entirely by changing the order of interchangeable shims in the clamped rotatable assembly without addition to or subtraction from the total number of shims carried in clamped relation on said rotatable assembly within said housing.

4. In an end thrust bearing for a rotating assembly, a housing having therewithin a pair of opposed fixed axially spaced annular thrust bearing surfaces, a rotary thrust member having at least two relatively axially adjustable parts interengaged in coaxial telescoping relation, thrust bearing surfaces on a pair of said relatively axially adjustable parts, means for centering said rotary thrust member in coaxial axially adjustable relation to said rotating assembly, and means securing said relatively axially adjustable parts in selected axial positions and nonrotatable relation to said rotating assembly, with said thrust bearing surfaces of said parts facing in opposite directions in rotatable thrust bearing relation to said opposed thrust bearing surfaces of said housing.

5. A thrust bearing assemblage comprising, a journal bearing housing having a shaft rotatably journaled therein, an end cap detachably secured in axially fixed relation to said housing and enclosing an end of said shaft, an end thrust bearing surface on the inner surface of said cap, a second end thrust bearing surface on said housing in fixed axially spaced opposed relation to said end thrust bearing surface of said cap, a pair of thrust plates detachably secured in coaxial relatively non-rotatable relation to said shaft and having thrust bearing surfaces facing in opposite directions for cooperation with said thrust bearing surfaces of said housing and cap respectively, clamping means on said shaft for positively moving each of said plates axially in the direction of an end surface of said shaft and interchangeable shims interposed between said end surface of said shaft and each of said plates respectively in selected numbers to variably fix the axial positions of said plates relative to said shaft and to each other.

ALEXANDER J. ROUBAL.

REFERENCES CITED

The following references are of record in the file of this patent:

UNITED STATES PATENTS

| Number | Name | Date |
| --- | --- | --- |
| 1,092,730 | Lundgren | Apr. 7, 1914 |
| 1,094,620 | Wilson | Apr. 28, 1914 |
| 1,165,594 | Hani | Dec. 28, 1915 |
| 1,355,706 | Snyder | Oct. 12, 1920 |
| 1,947,066 | Sieg | Feb. 13, 1934 |

FOREIGN PATENTS

| Number | Country | Date |
| --- | --- | --- |
| 11,995 | Great Britain | 1901 |
| 553,068 | France | Feb. 3, 1923 |
| 527,329 | Great Britain | Oct. 7, 1940 |